No. 705,367. Patented July 22, 1902.
J. C. LINCOLN.
APPARATUS FOR CURING MEAT.
(Application filed Dec. 20, 1901.)
(No Model.)
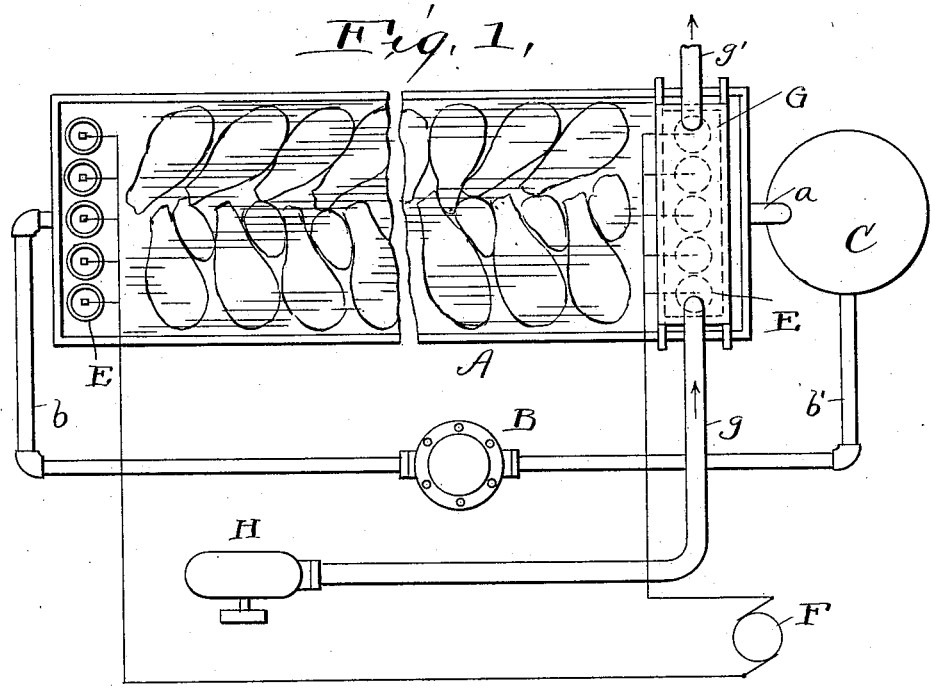
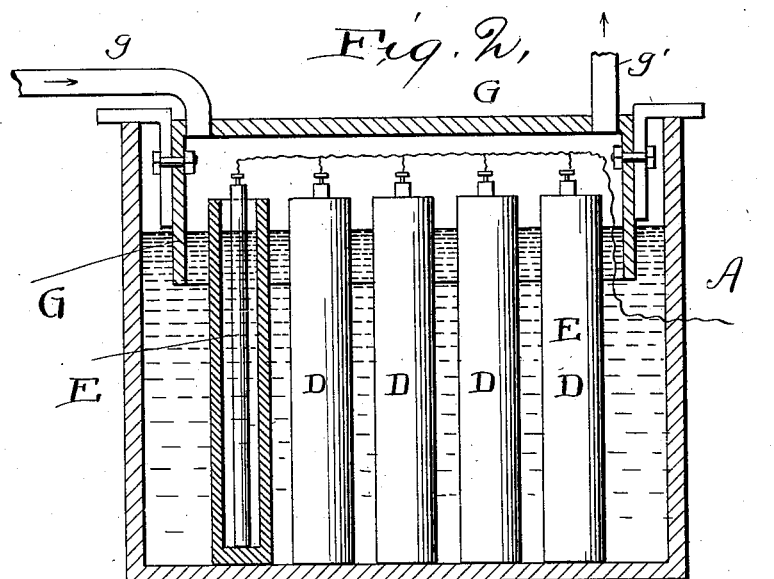
Witnesses
E. B. Gilchrist
H. W. Wise
Inventor
John C. Lincoln
By his attorneys
Thurston & Bates

UNITED STATES PATENT OFFICE.

JOHN C. LINCOLN, OF CLEVELAND, OHIO, ASSIGNOR TO B. B. QUINN, OF CLEVELAND, OHIO.

APPARATUS FOR CURING MEAT.

SPECIFICATION forming part of Letters Patent No. 705,367, dated July 22, 1902.

Application filed December 20, 1901. Serial No. 86,664. (No model.)

*To all whom it may concern:*

Be it known that I, JOHN C. LINCOLN, a citizen of the United States, residing at Cleveland, in the county of Cuyahoga and State of Ohio, have invented a certain new and useful Improvement in Apparatus for Curing Meat, of which the following is a full, clear, and exact description, reference being had to the accompanying drawings.

The invention relates to an apparatus for curing meats and the like with the assistance of a current of electricity, which is known to very materially hasten the desired result.

The object of this invention is to prevent injury to the meat by the chlorin gas generated by the electrolytic action from the brine and also to carry away such gas in order that the workmen in charge of the apparatus may, without danger or discomfort, inspect the tank and its contents.

The invention may be said to consist of the construction and combination of parts hereinafter described, as pointed out definitely in the claims.

In the drawings, Figure 1 is a plan view of an apparatus, which includes my improvement, for curing meat in the manner referred to; and Fig. 2 is a sectional end view of that end of the tank which contains the positive electrodes.

Referring to the parts by letters, A represents a tank of suitable size, preferably made of wood, and having an open top, which permits the inspection and manipulation of the meat therein, urging the curing process. Brine is preferably used as the curing solution, and the process is shortened and rendered more efficient if the brine is caused to circulate through the tank by means of a pump B, which discharges the brine into one end of the tank through the pipe $b$ and draws it through a pipe $b'$ from a supplemental tank C, into which the brine is discharged from the main tank A through the discharge-pipe $a$.

In the tank A, at opposite ends thereof, are porous cups D, containing the electrodes E E', which are preferably made of graphite. The positive electrodes E are connected together and to one pole of a generator F, while the negative electrodes E' are similarly connected together and to the other pole of said generator.

G represents a substantially gas-tight box, open only at its bottom, which is of such size that when inserted into the tank with its open side down and with its lower edges dipping below the surface of the brine this box will inclose the upper ends of the positive electrodes E and the porous cups in which they are contained. Two pipes $g\,g'$ are connected with this box, the pipe $g$ being the outlet-pipe, which is extended so as to discharge into the open air outside of the building in which the tank is contained. A forced circulation of air through this box is necessary, and this is produced most efficiently by connecting a fan-blower H with the inlet-pipe $g'$.

The meat to be cured having been put into a tank and covered with brine and the described electrical connections having been made and described mechanism set in operation, preferably using an electric current of about thirty amperes, chlorin gas will be produced by the electrolytic action on the brine at the positive electrodes E in the porous cups. This gas rising is caught in the box G, whose lower end is sealed by being immersed in the brine, and this chlorin gas, which, if not carried away, would not only contaminate the brine and burn the meat, but it would make it impossible for workmen to enter the same room with the tank for the purpose of inspecting and manipulating the meat in the tank, is blown out through the discharge-pipe $g$ by the operation of the blower H. This box may be supported by straps K, attached to the ends of the box and having their upper ends bent outward, so as to rest upon the top edges of the tank A. These straps have, preferably, vertical slots $k$, through which pass the bolts $k'$, which attach the straps to the box. This permits the adjustment of the box in the tank so that its lower open side may be sealed by the immersion of the edges of the box into the brine whatever, within limits, may be the distance of the surface of the brine below the top of the tank A.

Having described my invention, I claim—

1. In an apparatus for curing meat, the combination of a tank containing a brine curing solution, negative electrodes immersed in the brine at one end of the tank and suitably connected with one pole of an electric generator, positive electrodes immersed in the brine near the opposite end of the tank and suitably connected with the other pole of the generator, with a gas-tight box open at its lower side which is placed over the upper ends of said positive electrodes with its lower edge immersed in the brine and thereby sealed, inlet and outlet pipes connected with said box, and means for creating a forced circulation of air through said box.

2. In an apparatus for curing meat, the combination of a tank, negative electrodes immersed in the brine at one end of the tank and suitably connected with one pole of an electric generator, porous cups immersed in the brine at the other end of the tank, and positive electrodes in said porous cups electrically connected with the other pole of the generator, with a gas-tight box open on its lower side which is placed over the upper ends of said positive electrodes and the porous cups in which they are contained with its lower edges immersed in the brine and thereby sealed, inlet and outlet pipes connected with said box, and means for creating a forced circulation of air through said box.

3. In an apparatus for curing meat, a tank having inlet and outlet pipes by means of which the brine may be caused to circulate through said tank, negative electrodes immersed in the brine at one end of the tank and suitably connected with one pole of an electric generator, porous cups in the other end of the tank, positive electrodes in said porous cups, electrically connected with the other pole of the generator, and a gas-tight box open on its lower side placed over the upper ends of said positive electrodes and the porous cups in which they are contained and having its edges immersed in the brine and thereby sealed, inlet and outlet pipes connected with said box and a blower connected with the inlet-pipe.

In testimony whereof I hereunto affix my signature in the presence of two witnesses.

JOHN C. LINCOLN.

Witnesses:
E. B. GILCHRIST,
E. L. THURSTON.